(12) United States Patent
Uh et al.

(10) Patent No.: US 8,202,648 B2
(45) Date of Patent: Jun. 19, 2012

(54) PRISMATIC LITHIUM ION BATTERY

(75) Inventors: Hwail Uh, Yongin-si (KR); Sangwoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1142 days.

(21) Appl. No.: 12/068,845

(22) Filed: Feb. 12, 2008

(65) Prior Publication Data
US 2008/0220328 A1  Sep. 11, 2008

(30) Foreign Application Priority Data

Mar. 7, 2007 (KR) .......................... 10-2007-0022444

(51) Int. Cl.
*H01M 2/08* (2006.01)
(52) U.S. Cl. ...................................... 429/185; 429/175
(58) Field of Classification Search ................... None
See application file for complete search history.

(56) References Cited

U.S. PATENT DOCUMENTS

| | | | | |
|---|---|---|---|---|
| 6,630,270 B1 * | 10/2003 | Kim et al. | ........................ | 429/94 |
| 2005/0106453 A1 * | 5/2005 | Yamauchi et al. | ............ | 429/166 |
| 2006/0051666 A1 * | 3/2006 | Kim | ............................... | 429/184 |
| 2006/0093902 A1 | 5/2006 | Lee | | |

FOREIGN PATENT DOCUMENTS

| | | |
|---|---|---|
| JP | 2000182573 | 6/2000 |
| JP | 2001-057179 | 2/2001 |
| JP | 2003042938 | 2/2003 |
| KR | 1020020067648 A | 8/2002 |
| KR | 1020040074415 | 8/2004 |

* cited by examiner

*Primary Examiner* — Barbara Gilliam
*Assistant Examiner* — Stephan Essex
(74) *Attorney, Agent, or Firm* — Robert E. Bushnell, Esq.

(57) ABSTRACT

A prismatic lithium ion battery having an electrode assembly, a prismatic can which receives the electrode assembly and a cap assembly which closes the open end of the prismatic can, wherein two deformed surfaces are formed in each major surface area of the prismatic can opposite to each other, respectively so that they are bent from exterior to interior and indented, and formed in the shape of a band connecting two narrow sides in the longitudinal direction, and formed one by one close to two large sides of the major surface areas but the intermediate parts are close to each other than the ends. In accordance to the present invention, in case that the expansion of the battery or the internal gas generation, the expansion of the battery in the thickness direction is prevented, and the risk, making an internal short-circuit because the insulating case is not pressed to the can as the prismatic can expand, may be reduced.

17 Claims, 5 Drawing Sheets

PRISMATIC LITHIUM ION BATTERY

CLAIM OF PRIORITY

This application makes reference to, incorporates the same herein, and claims all benefits accruing under 35 U.S.C. §119 from an application earlier filed in the Korean Intellectual Property Office on Mar. 7, 2007 and there duly assigned Serial No. 10-2007-0022444.

BACKGROUND OF THE INVENTION

1. Field of the Invention

The present invention relates to a lithium ion battery, and more particularly to a prismatic lithium ion battery having a structure able to suppress swelling.

2. Description of the Related Art

A lithium ion battery is used as a power source for portable electronic appliances, because the lithium ion battery can store more energy in a smaller volume and with less mass. The lithium ion battery is divided into a can-type battery having a case receiving an electrode assembly made of a constant shape metal can, and a pouch-type battery having a case receiving an electrode assembly made of a thin, flexible pouch.

The lithium ion battery employs one of cobalt acid lithium, nickel acid lithium, manganese acid lithium, and lithium salt of an oxide of a solid solution containing at least two of cobalt, nickel and manganese, which can occlude and discharge lithium-ion, as a positive active material. Various of carbon structures, which can occlude and discharge lithium-ion, are used as a negative active material. The positive active material and negative active material are formed into a binder, solvent, conductive agent and slurry are coated on the surface of a collector, and thus an electrode is formed.

A separator is installed between positive and negative electrode plates, and an electrolyte which makes the current flow through the medium of the lithium ion between the two electrodes is employed.

Because the lithium battery has a high charge/discharge operation voltage, the side reaction between the electrolyte and the electrode material may occur when a high voltage is applied, or the side reaction between the electrolyte and the electrode material may occur at high temperature due to heat generated during battery operation.

For a graphite negative electrode, the volume of battery increases when the battery is charged, and the volume increase results in expansions of the electrode assembly and the battery.

The gas generation and internal pressure increase are mainly due to anomalous reaction in the battery. If the anomalous reaction persistently happens or above a certain level, the safety of the battery is decreased.

Even the internal pressure increase and the expansion of the battery happens by slow degrees during a normal operation, the expansion is irrelevant to the safety. The structure of the battery is designed to operate the battery in case of such an expansion of the battery during normal operation.

Even during a normal operation, the expansion of the battery may cause operational problems of the battery. For example, when a rectangular battery is selected due to a thin installation space, the expansion of the prismatic lithium ion battery degrades the adaptability in the electronics, and it may even cause the breakdown of the electronics and the fracture of the battery. The prismatic lithium ion battery is lithium ion battery with a prismatic cell, prismatic cells have narrow and slimmer shapes and are most common in the lithium battery family.

Furthermore, even if the battery is expanded with ease, the internal pressure increase is delayed due to the battery expansion for a long time, and it is possible that a thermal runway or an ignition is occurred before the safety device is activated.

Therefore, in order to prevent the problems above, an improved case design of the battery is needed to prevent the case from swelling or increasing in thickness in case of a certain degree of the electrode expansion or gas generation.

SUMMARY OF THE INVENTION

It is, therefore, one object of the present invention to provide an improved prismatic lithium ion battery having a structure being able to suppress swelling.

A prismatic lithium ion battery is provided having a structure which is able to suppress an expansion of the thickness of the battery.

In one exemplary embodiment, a prismatic lithium ion battery prevents an electrode assembly, a cap assembly and an insulating case, installed to prevent short-circuit between electrode taps, from leaving their original positions, thus reduces the possibility of the internal short-circuit.

A prismatic lithium ion battery having an electrode assembly, a prismatic can receiving the electrode assembly and a cap assembly closing an open end of the prismatic can, wherein two deformed surfaces are formed in the two major surface areas of the prismatic can opposite to each other, respectively so that they are formed one by one closely to two long sides of the major surface area in the longitudinal direction and the intermediate parts are closer to each other compared to the distance between the ends based on the longitudinal direction. The deformed surface is bent from exterior to interior and indented.

In accordance to the present invention, the deformed surfaces may be symmetrical about a central axis facing the longitudinal direction in the respective major surface area. One of the two deformed surface is formed in the same pattern as the other of the two deformed surface.

In accordance to the present invention, both ends of the deformed surface are configured to face toward two edges connected by one long side in the major surface area of the can or they are configured to be connected to the two edges of the can.

Furthermore, the deformed surfaces in accordance to the present invention form gently-sloping curved line in the form of the hyperbolic curve or line with bent in the middle.

Meanwhile, the deformed surface is configured that it covers the range from the between a range of 5% of the length of the can below the upper side of the major surface area to 5% of the length of the can above the lower side of the major surface area in the longitudinal direction of the can, even if it does not reach two short sides, i.e. upper or lower side. At this time, referring to the cross-sectional view taken perpendicular to the longitudinal direction in the range where the deformed surface is formed, each of two bottle-neck parts is formed in the both sides of the prismatic can, respectively.

In accordance to the present invention, the deformed surface is formed so that the prismatic can is made in the form of rectangular box and the deformed surface passes the region which is to be deformed extremely by the internal pressure in the state of being sealed with the cap assembly.

In the present invention, the deformed surface is not required to be thin such as a safety bent, and it is formed by pressing a can with uniform thickness at some part so that the indented part and the other parts have same thickness.

In accordance to another embodiment of the present invention, the present invention having an electrode assembly and a prismatic can receiving the electrode assembly, wherein two deformed surfaces which are bent from exterior to interior and indented and formed in the longitudinal direction connecting the upper/lower sides in the major surface areas.

Here, the prismatic can is provided with two major surface areas and the deformed surface containing surface connecting the two major surface areas, the deformed surface is formed in the connecting part where the major surface area and the deformed surface containing surface are connected to each other.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, the present invention will be explained with reference to the accompanying drawings.

Figure 1:
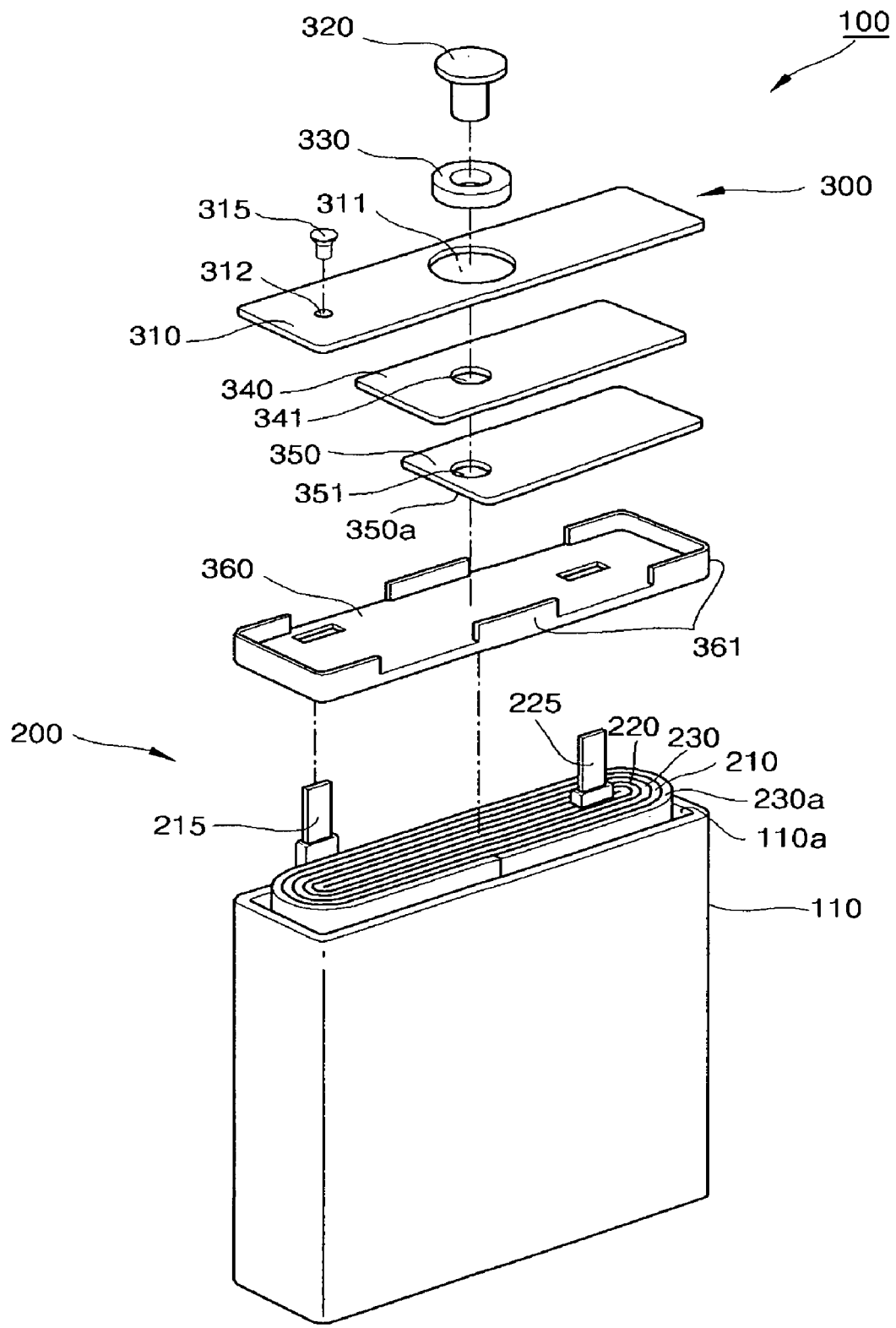
FIG. 1 is an exploded perspective view of a lithium ion battery in accordance to the present invention.

FIG. 1 is an exploded perspective view of a prismatic lithium ion battery in accordance to the present invention. As shown in FIG. 1, a prismatic lithium ion battery 100 is composed of a can 110 of a rechargeable battery, a jelly-roll type electrode assembly 200 which is provided in the can 110, and a cap assembly 300 which is connected to the upper part of can 110.

Can 110 is made of a metallic material having cylindrical or rectangular shape, with one side open having an open end 110a, and can 110 may serve as a terminal.

Electrode assembly 200 is composed of a positive electrode plate 210 to which a positive electrode tap 215 is attached, a negative electrode plate 220 to which a negative electrode tap 225 is attached, and a separator 230 provided between positive electrode plate 210 and negative electrode plate 220 in the rolled shape. Further, electrode assembly 200 includes an insulating tape 230a that covers the outer surface of electrode assembly 200.

An insulating case 360 having rims 361 is arranged on electrode assembly 200 inserted into can 110, and thus prevents short-circuit between electrode assembly 200 and a cap plate 310. Cap plate 310 seals open end 110a, and is electrically connected to positive electrode tap 215. Negative electrode tap 225 is welded to the lower surface 350a of a terminal plate 350 which is electrically connected to an electrode terminal 320 installed through a electrode through-hole 311 of cap plate 310. In order to insulate electrode terminal 320 and cap plate 310, electrode terminal 320 is installed in electrode through-hole 311 via a gasket 330, in order to insulate cap plate 310 and terminal plate 350, an insulating plate 340 is installed between terminal plate 350 and cap plate 310. Through-holes 341, 351 are formed in insulating plate 340 and a terminal plate 350 respectively, electrode terminal 320 to terminal plate 350 are electrically connected.

After cap plate 310 is welded to can 110 and finished, an electrolyte solution (not shown in figures) is supplied to the electrode assembly through an injection port 312 and injection port 312 is sealed by a plug 315.

Figure 2A:
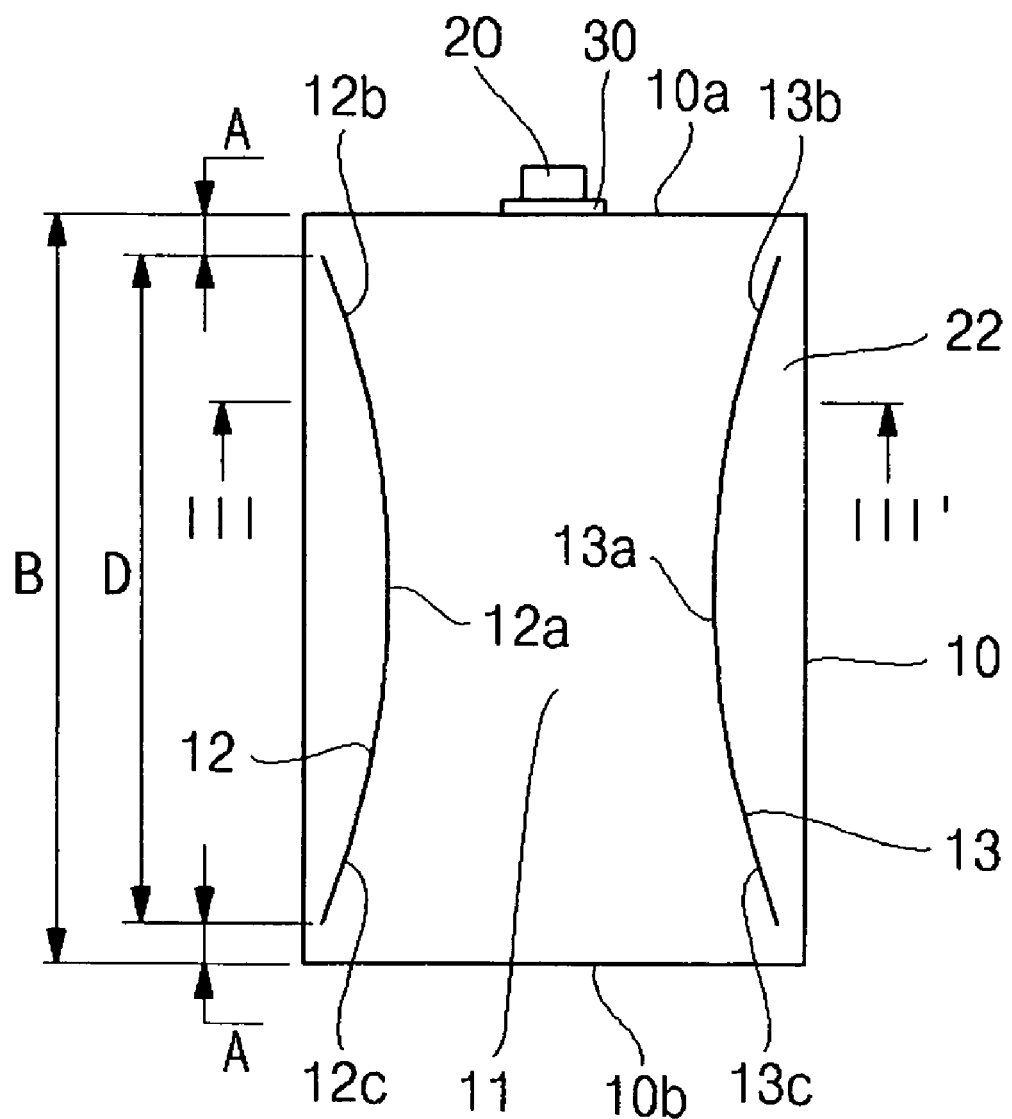
FIGS. 2a and 2b are a front view of the prismatic lithium ion battery in accordance to the present invention.
Figure 2B:
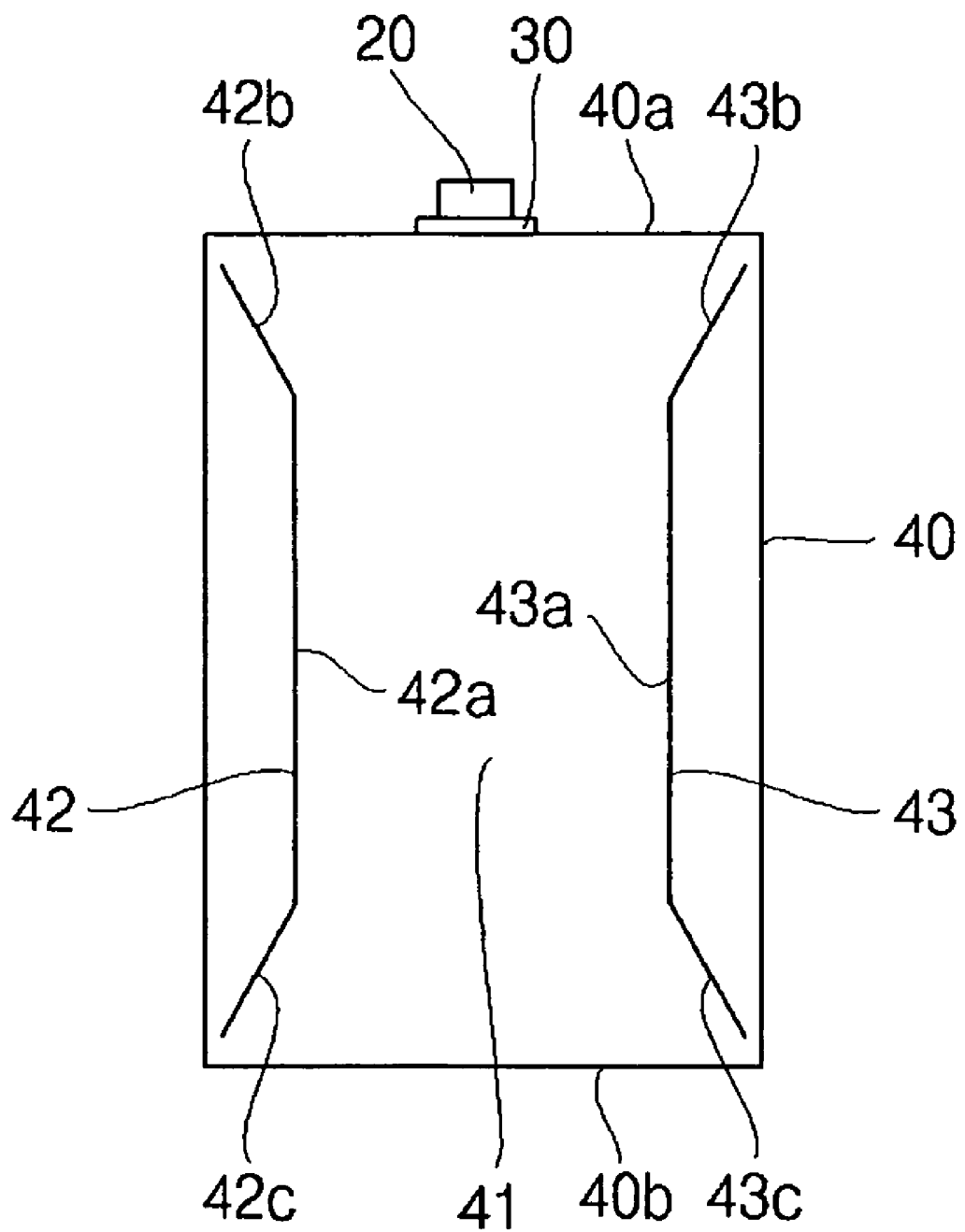

FIGS. 2a and 2b are a front view of the prismatic lithium ion battery in accordance to the present invention.

As shown in FIG. 2a, two elongated deformed surfaces 12 and 13 are formed in one of a major surface area 11 of prismatic can 10 in the longitudinal direction connecting the upper side 10a and lower side 10b of the side surface. Intermediate parts 12a and 13a of two elongated deformed surfaces 12 and 13 are formed to be closer to each other than the distance between upper terminal portions 12b and 13b and lower terminal portions 12c and 13c. Deformed surfaces 12 and 13 are formed in gently-sloping hyperbolic curves facing to each other. Two elongated deformed surfaces 12 and 13 may reach the upper and lower side of large area side surface.

Deformed surfaces 12 and 13 are formed symmetrically about longitudinal direction central axis of major surface area 11 so that they suppress asymmetrical swelling. Even if it is not described, it is preferable that a pairs of deformed surfaces are formed in opposite major surface area 11 of prismatic can 10 of the prismatic lithium ion battery. That is, only when the deformed surfaces are formed in both major surface areas, then the expansion of the prismatic can in the thickness direction is prevented. In this case, the deformed surfaces formed in the front major surface area 11 and the deformed surfaces formed in the rear major surface area are piled up in the thickness direction of prismatic can 10. The reference numerals 20, 30 refer to the electrode terminal and the gasket of the prismatic lithium ion battery, respectively.

As shown in FIG. 2b, two elongated deformed surfaces 42 and 43 are formed in one of a major surface area 41 of prismatic can 40 in the longitudinal direction connecting the upper side 40a and lower side 40b of the side surface. Intermediate parts 42a and 43a of two deformed surfaces 42 and 43 are formed that they are positioned closer to each other than the distance between upper terminal portions 42b and 43b and lower terminal portions 42c and 43c. Deformed surfaces 42, 43 of FIG. 2b are straight, concave creases with bent ends in obtuse angles.

Deformed surfaces 42 and 43 are formed symmetrically about longitudinal direction central axis of major surface area 41 so that they suppress asymmetrical swelling. Even if it is not described, it is preferable that a pairs of deformed surfaces are formed in the opposite major surface area 41 of prismatic can 40 of the prismatic lithium ion battery. That is, only when the deformed surfaces are formed in both major surface areas, then the expansion of the prismatic can in the thickness direction is prevented. In this case, the deformed surfaces formed in front major surface area 41 and the deformed surfaces formed in the rear major surface area are piled up in the thickness direction of prismatic can 40.

The upper and lower terminal portions of the respective deformed surfaces are not connected to two edges of the can, but they face toward the two edges of the can.

As shown in FIG. 2a, when deformed surfaces 12 and 13 can not reach the upper and lower side of major surface area 11 in which the deformed surfaces are formed, deformed surfaces 12 and 13 may be formed in the range of D. Range A is 5% of range B in length. In other word, deformed surfaces 12 and 13 may be formed in major surface area 11 between a range of 5% of the length of the can below the upper side of the major surface area to 5% of the length of the can above the lower side of the major surface area in the longitudinal direction of the can. Here, referring to FIG. 3 illustrating cross-section taken III-III' line perpendicularly to the longitudinal direction, bottle-neck parts 12 and 13 are formed in the both side of the prismatic can in the width direction.

The deformed surfaces of the present invention are configured so that the prismatic can is formed to be similar to a rectangular box and the curves of deformed surfaces 12, 13 extend beyond the region which is deformed extremely when the internal pressure is applied in the sealed state. In this case, if the curved part is originally formed as a longitudinally extending concave crease that defines the arcs of deformed surfaces 12, 13 in the opposite direction away from the direction which deformed surfaces 12, 13 would be deformed if subjected to high internal pressure, then it can efficiently resist to the deformation of the prismatic can in accordance to the internal pressure increase of the battery. Therefore, the deformation of the battery is minimized. The most deformed part of the prismatic can sealed by the cap plate as the internal pressure increase may be different depending on the thickness of the prismatic can, the ratio of width to height, the thickness of the wall and so on, however the contour of the part to be deformed is usually similar to that of the deformed surface of FIG. 2.

Figure 3:
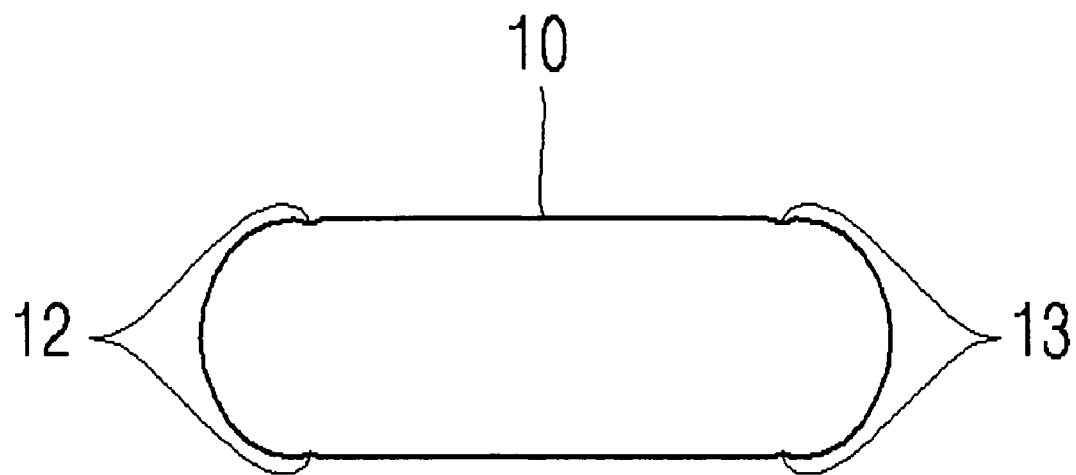
FIG. 3 is a schematic cross-sectional view illustrating a region which a deformed surfaces of a prismatic can have been formed therein.
Figure 4:
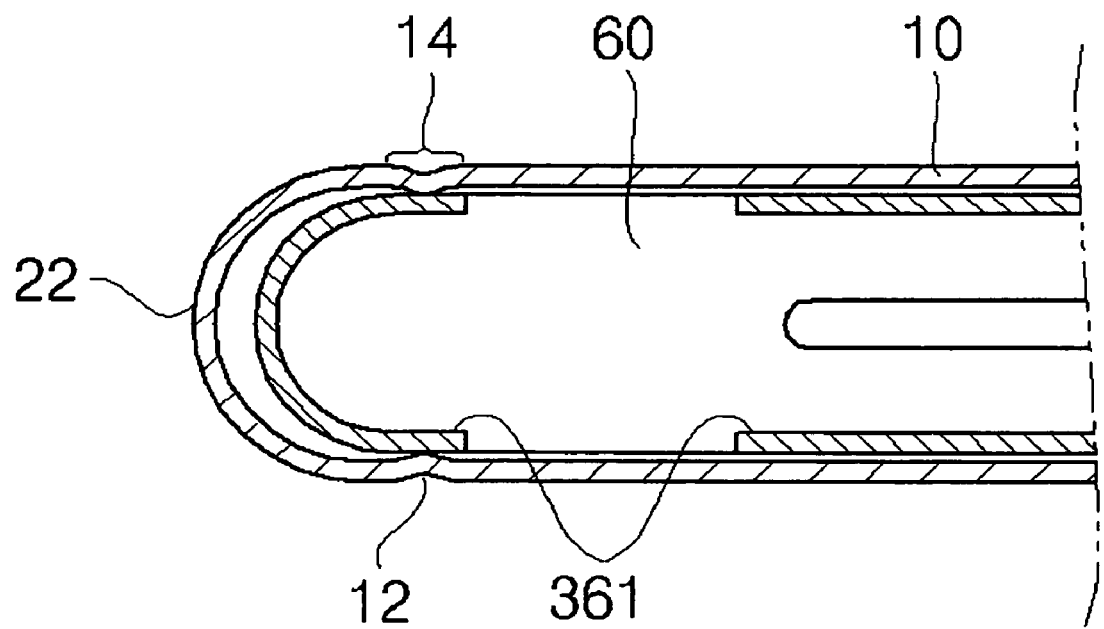
FIG. 4 is a detailed cross-sectional view illustrating the prismatic can at which an insulating case is positioned and illustrating an installation relationship of the insulating case.

FIG. 4 is a part of a detailed cross-sectional view illustrating the prismatic can at which an insulating case is positioned of FIG. 3 and illustrating an installation relationship of the insulating case.

As shown in FIG. 4, deformed surface 12 of the present invention is not required to be as such as a safety vent, and it may be formed by pressing can 10 with uniform thickness at some part. The indented part and the other parts have same thickness.

Deformed surface 12 contacts with the outer circumference of an insulating case 60 installed in prismatic can 10. If all the deformed surfaces of prismatic can 10 seize insulating case 60, then insulating case 60 may be stably fixed in prismatic can 10. Therefore, the possibility of short-circuit due to the distortion or displacement of the insulating case by the external impact is reduced.

Figure 5:
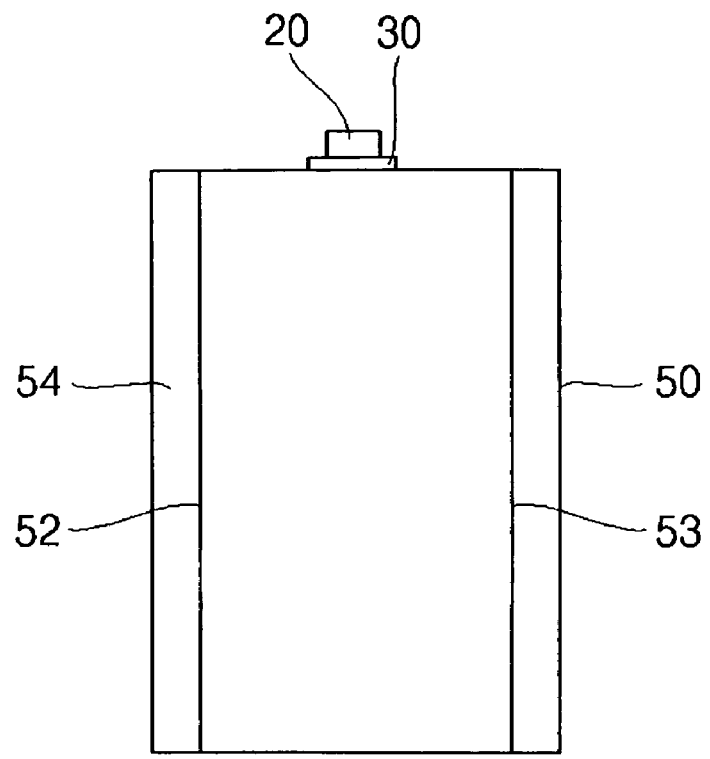
FIG. 5 is a front view illustrating the front part of the prismatic can in accordance to another embodiment of the present invention.

FIG. 5 is a front view illustrating the front part of the prismatic can in accordance to another embodiment of the present invention.

In accordance to FIG. 5, elongated deformed surfaces 52 and 53 are formed as the straight line contrary to that of FIGS. 2a and 2b. The position of deformed surfaces 52 and 53 is provided at the connecting part of a narrowed side surface 54 and the planar major surface area as a band, when narrow side surface 54 is a fully deformed surface and has a fully rounded cross-section. This deformed surface is formed so that the major surface area has a partially convex portion in the inner side of the can.

Therefore, the major surface area may prevent the battery from swelling in the middle of it at a certain level.

This shape can be applied to any kind of the rectangular battery, and thus it is easy to design because there is no need to deduce the most deformed part, and it is useful to suppress swelling.

Figure 6:
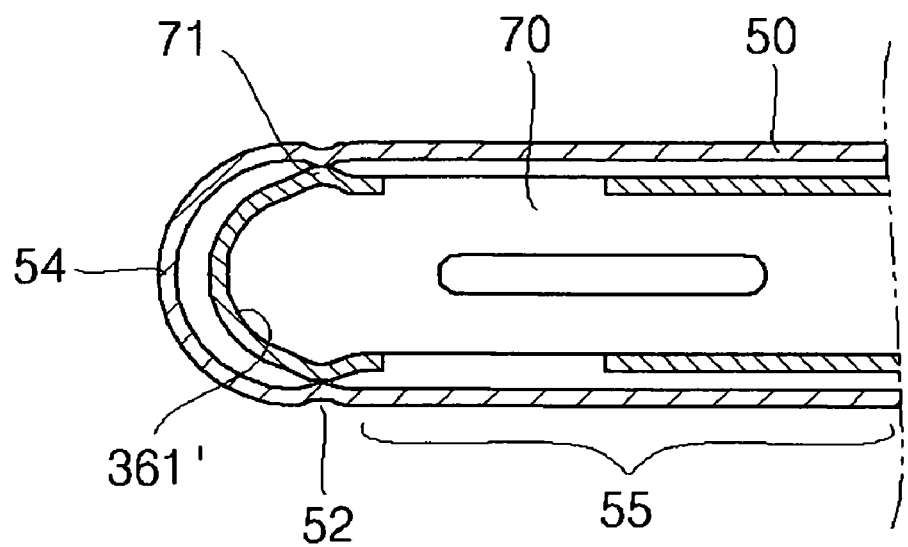
FIG. 6 is a part of a cross sectional view illustrating the prismatic can at which the insulating case is positioned in accordance to another embodiment of the present invention.

FIG. 6 is a part of a cross sectional view illustrating the prismatic can at which the insulating case is positioned in accordance to another embodiment of the present invention.

As shown in FIG. 6, deformed surface 52 formed in prismatic can 50 contacts with an external part of the insulating case 70 having deformed rims 361', in particular, with a protrusion 71 of insulating case 70 installed in prismatic can 50. This protrusion 71 may be intentionally designed to meet with the deformed surface. Four deformed surfaces of prismatic can 50 press the corresponding formed protrusion 71 and adhere to protrusion 71, and thus insulating case 70 can be stably fixed in prismatic can 50. Therefore, the danger of short-circuit due to the distortion or displacement of the insulating case by the external impact is reduced.

Referring briefly to FIG. 4, the deformation of can 10 along deformed surfaces, or arcs 12, 13 forms an exterior concave, or deformed surface 14. Referring briefly to FIG. 2a and FIG. 4, major surface areas 11 are interposed between two minor surfaces 22.

In accordance to the present invention, the expansion in thickness of the battery is suppressed in case of the battery expansion because of charging the battery and the internal gas generation. Therefore, the adaptability is increased and the delay of the safety vent operation is prevented, and thus the safety of the battery is improved. The swelling of the battery if swelled from the interior to the exterior of the can. Therefore, in order to prevent swelling of the can, a portion of two opposite sides of the can is protruded inside the can so that the swelling of the battery (or an electrode assembly of the battery) may be prevented.

Furthermore, the danger of short-circuit between the electrode assembly and cap plate and electrode tap of the electrode assembly due to the displacement of the insulating case is reduced.

What is claimed is:

1. A prismatic lithium ion battery, comprising:
an electrode assembly;
a prismatic can receiving the electrode assembly via an opening;
a cap assembly comprising a cap plate which seals the opening of the prismatic can;
an insulating case disposed within the prismatic can between the electrode assembly and the cap plate;
the prismatic can comprising two deformed surfaces formed in each major surface area of the prismatic can opposite to each other, said deformed surfaces being formed spaced-apart along two longer edges of the major surface area, said deformed surfaces being formed in a predetermined range of the major surface areas, said deformed surfaces being in physical contact with an outer periphery of the insulating case and retentively engaging the insulating case; and
intermediate parts of the deformed surfaces being closer to each other in comparison with distances between terminal portions of the deformed surfaces.

2. The prismatic lithium ion battery of claim 1, in which the two deformed surfaces are formed symmetrically about a longitudinal central axis of the major surface area.

3. The prismatic lithium ion battery of claim 1, in which one of the two deformed surfaces is formed in a same pattern as the other of the two deformed surfaces.

4. The prismatic lithium ion battery of claim 2, in which one of the two deformed surfaces is formed in a same pattern as the other of the two deformed surfaces.

5. The prismatic lithium ion battery of claim 1, in which both terminal portions of the deformed surface are connected by one longer side in the major surface area and face toward two edges of the can which are connected by the one longer side of the major surface area, or both terminal portions of the deformed surface are connected to the two edges of the can.

6. The prismatic lithium ion battery of claim 1, in which the deformed surfaces are formed in a shape of a hyperbolic curve in the major surface areas.

7. The prismatic lithium ion battery of claim 1, in which the deformed surfaces are formed in the shape of straight, concave creases with the terminal portions bent in obtuse angles and intermediate parts extending parallel to each other.

8. The prismatic lithium ion battery of claim 6, in which the deformed surfaces are formed from 5% of the length of the can below the upper side of the major surface area to 5% of the length of the can above the lower side of the major surface area in the longitudinal direction of the can.

9. The prismatic lithium ion battery of claim 1, in which the deformed surfaces pass a region which is to be extremely deformed when internal pressure within the prismatic can is increased in a state that the prismatic can is formed without the deformed surfaces.

10. The prismatic lithium ion battery of claim 1, in which the deformed surfaces are formed in the same thickness as that of other regions in the major surface area of the can.

11. The prismatic lithium ion battery of claim 1, in which the insulating case has a protrusion on part of outer periphery, and the deformed surfaces adhere to the protrusion and stably hold the insulating case.

12. The prismatic lithium ion battery of claim 1, in which the deformed surfaces are bent from exterior to interior and indented.

13. The prismatic lithium ion battery of claim 1, in which the deformed surfaces are formed in a shape of a series of straight lines in the major surface areas.

14. A prismatic lithium ion battery, comprising:
an electrode assembly;
a prismatic can receiving the electrode assembly via an opening;
a cap assembly comprising a cap plate which seals the opening of the prismatic can;
an insulating case disposed between the electrode assembly and the cap plate;
said prismatic can comprising a plurality of minor surface areas, a plurality of major surface areas interposed between the minor surface areas, and a plurality of distinct and unconnected elongated deformed surfaces formed in each major surface area spaced-apart from and opposite to each other and formed in a predetermined range of the major surface areas; and
said elongated deformed surfaces formed spaced farther apart from a center of each major surface area than from the minor surface area, said elongated deformed surfaces in physical contact with an outer perimeter of the insulating case, and said elongated deformed surfaces retentively engaging and holding the insulating case within the prismatic can.

15. The prismatic lithium ion battery of claim 14, in which the deformed surfaces are formed in a shape of a hyperbolic curve in the major surface areas and are parallel to each other in an immediate part.

16. The prismatic lithium ion battery of claim 14, in which the deformed surfaces are formed in the shape of straight, concave creases with ends bent in obtuse angles and intermediate sections extending parallel to each other in an immediate part.

17. The prismatic lithium ion battery of claim 14, in which the deformed surfaces are formed in a shape of a straight line in the major surface areas.

* * * * *